Figure 1:
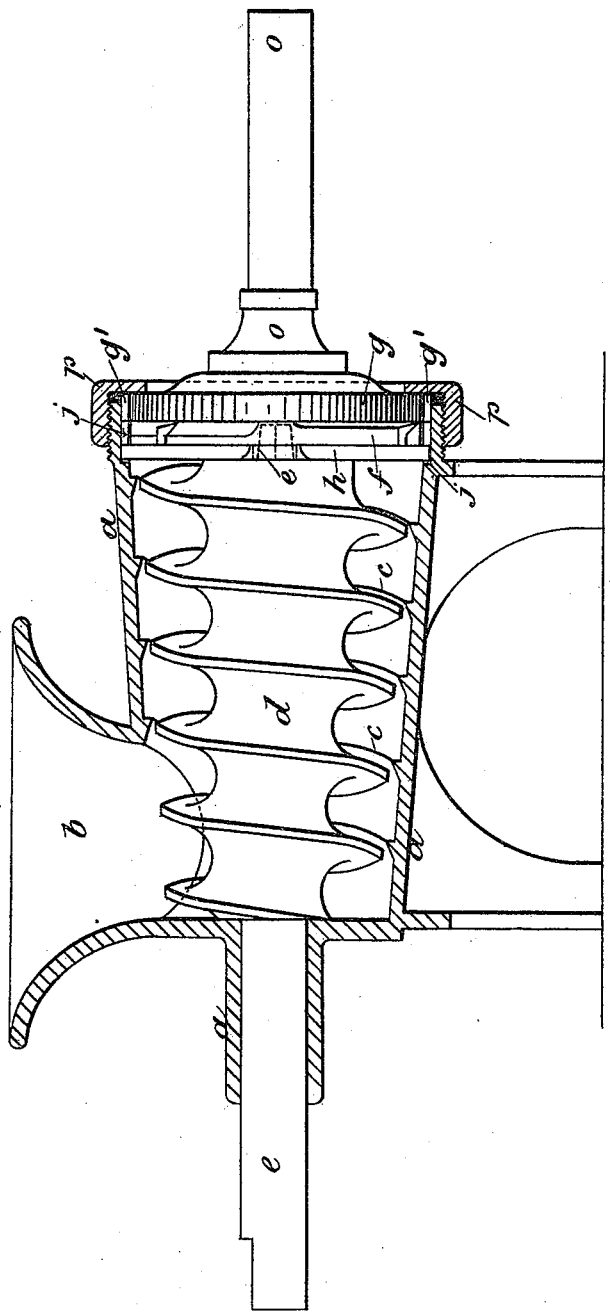

(No Model.) 2 Sheets—Sheet 1.

T. WILLIAMS, Jr.
MINCING MACHINE.

No. 440,215. Patented Nov. 11, 1890.

Witnesses:
H. Y. Davis
J. M. Copenhaver

Inventor:
Thomas Williams Jr.
by his Attorney.

(No Model.) 2 Sheets—Sheet 2.
T. WILLIAMS, Jr.
MINCING MACHINE.
No. 440,215. Patented Nov. 11, 1890.
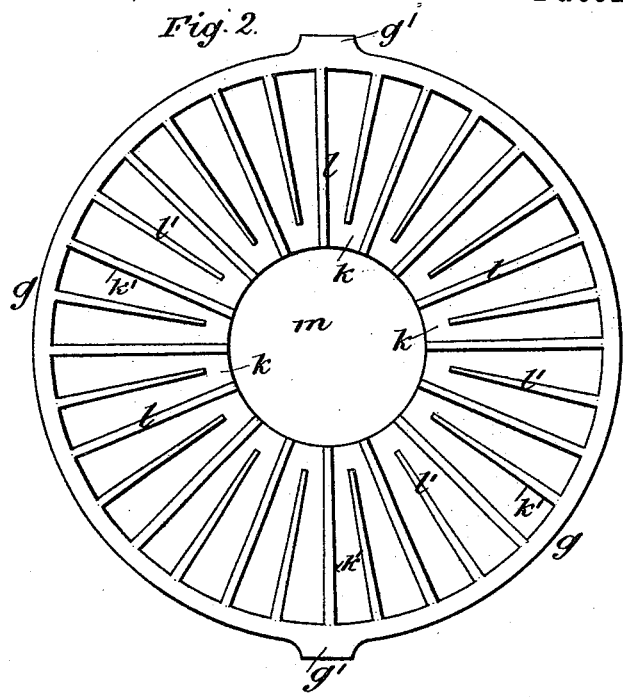
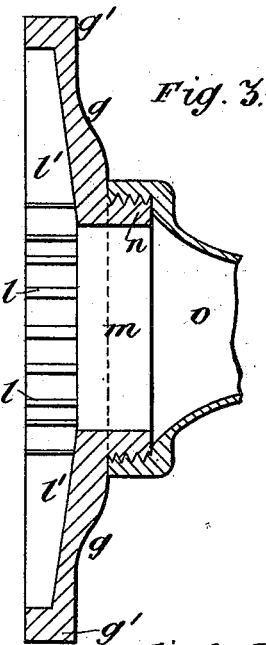
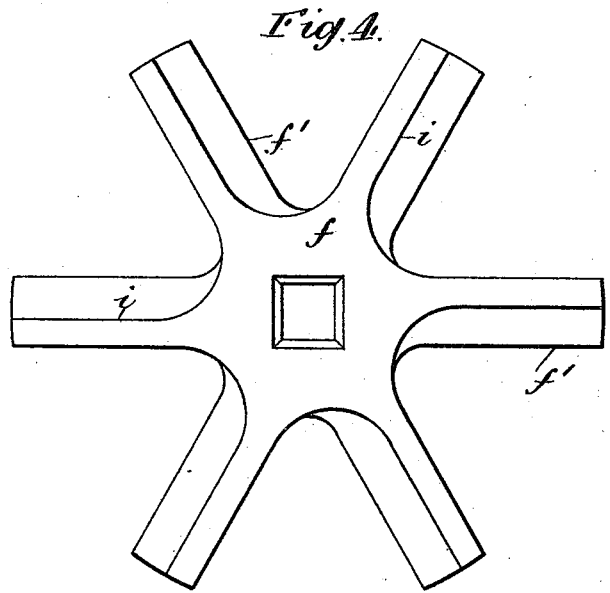
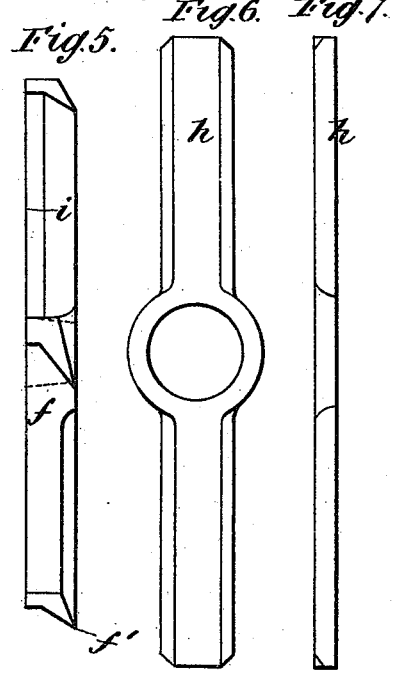

UNITED STATES PATENT OFFICE.

THOMAS WILLIAMS, JR., OF LONDON, ENGLAND.

MINCING-MACHINE.

SPECIFICATION forming part of Letters Patent No. 440,215, dated November 11, 1890.

Application filed July 9, 1890. Serial No. 358,074. (No model.) Patented in England February 14, 1890, No. 2,457.

*To all whom it may concern:*

Be it known that I, THOMAS WILLIAMS, the younger, engineer, a subject of Her Majesty, the Queen of Great Britain and Ireland, residing at 45 Myddelton Square, in the county of Middlesex, England, have invented new and useful Improvements in Mincing-Machines, (for which I have obtained Letters Patent in Great Britain, No. 2,457, dated February 14, 1890,) of which the following is a specification.

This invention relates to improvements in that type of mincing-machines wherein the meat to be cut up is caused by a forcing-screw within a casing to enter perforations extending through a cutting-plate which closes the delivery end of such casing, such portions of the meat as have entered the said perforations being severed from the rest of the mass by means of a knife working in cutting contact with the face of such plate, the cutting action taking place between the edges of the knife and the edges of the perforations, which act conjointly somewhat after the manner of a pair of scissors. Now I have found in practice that machines of this type present objectionable features. They are hard to work on account of the great power required to force the meat into and through the small perforations in the cutting-plate, (for if a cutting-plate with large perforations is employed the meat will be cut too coarse,) the perforations are liable to clog, and if it is desired to use the machines for simultaneously cutting and "filling" auxiliary forcing mechanism must be employed on the outer side of the perforated cutting-plate, the obstruction afforded by such plate to the passage of the meat preventing the action of the forcing-screw within the casing from being utilized for simultaneously filling also.

Now my invention is designed to remove these objections, and for this purpose consists, essentially, in dispensing with the aforesaid perforated cutting-plate and substituting therefor a cutting-plate of peculiar and novel construction, which I shall now proceed to describe.

According to my invention the cutting-plate consists of a metal disk provided upon one face with a number of grooves or channels which converge toward or lead into a delivery orifice or aperture extending through the plate. The grooved or channeled face of the said plate is ground or faced true, so as to bring the edges of the grooves or channels therein to a sharp angle or cutting-edge, and a knife is disposed to work in cutting contact with such grooved or channeled face, the edges of the revolving knife and the edges of the grooves or channels imparting a perfect scissor cut to the substance passing between them.

The machine to which my invention is applied may be of the well-known construction and comprises a cylinder or casing at or near the delivery end of which the above described cutting-plate and knife or knives are situate, and a forcing-screw within the casing for forcing the meat up against the grooved or channeled face of the said cutting-plate. As fast as the meat enters the said grooves or channels it is severed by means of a succession of perfect scissor cuts taking place, as before explained, between the sharp edges of the knife and grooves, the severed portions slipping along the said grooves toward and passing through the before-mentioned outlet-aperture in the cutting-plate. I prefer, in order to facilitate the escape of the cut meat, that the grooves or channels should deepen as they approach the said outlet-aperture.

If it is desired to employ the machine for simultaneously cutting and filling, the outlet-aperture may lead into a filling pipe or nozzle suitably secured upon the outer or plain side of the cutting-plate. This outlet-aperture being of large size as compared with the perforations in an ordinary perforated cutting-plate, and the cut meat having free access to the same at all times along the grooves or channels whatever the position of the revolving knife, the forcing device within the casing will suffice to propel the cut meat into skins without necessitating the employment of an auxiliary forcing device upon the outer side of the cutting-plate.

In the accompanying drawings, Figure 1 illustrates in sectional elevation a machine embodying my invention. Figs. 2 and 3 are detached views, in elevation and transverse section, of the grooved or channeled plate. Figs. 4, 5, 6, and 7 are detached views, in elevation and edge view, of the rotating and stationary knives.

$a$ is the casing of the machine, provided with the usual hopper $b$ and well-known internal spiral or longitudinal ribs $c$.

$d$ is a forcing-screw, upon the axis $e$ of which is mounted so as to rotate therewith the star-knife $f$, which revolves in cutting contact with the grooved or channeled face of the cutting-plate $g$. I prefer that the axis $e$ of the forcing-screw should taper slightly and be of square or polygonal section where it enters the star-knife $f$, the aperture in which is of corresponding shape, (see Figs. 1, 4, and 5,) as this arrangement will prevent the said knife from being placed on the axis $e$ in the wrong position.

$h$ is a stationary knife extending across the casing, between which and the rear edges $i$ of the "star-knife" $f$ a preliminary cut is given to the meat under operation before it reaches the cutting-plate $g$.

$jj$ are short longitudinal grooves in the casing $a$, which receive the extremities of the stationary knife $h$, and the lugs or projections $g'$ of the cutting-plate $g$ and prevent such knife and plate from rotating. The stationary knife $h$ may be dispensed with, if desired; but I prefer to employ the same as rendering the machine easier to work.

$kk$ are the grooves or channels formed in the inner face of the cutting-plate $g$ and leaving between them the ribs $l$. I prefer to subdivide these grooves or channels $k$ as they approach the circumference of the cutting-plate $g$ by means of shorter ribs $l'$, thus obtaining an extra number of cuts without unduly narrowing the outlets of such grooves and thereby impeding the exit of the meat. $m$ is an outlet aperture or orifice extending through the cutting-plate $g$, toward and into which the grooves $k$ converge and lead. I prefer that these grooves $k$ should, for reasons before given, deepen as they approach the outlet-orifice $m$, as shown in Fig. 3. $n$ is a projecting flange surrounding the outlet-aperture $m$ on the outer or plain side of the cutting-plate $g$, onto which flange is screwed (when the machine is to be employed for simultaneously cutting and filling) the filling pipe or nozzle $o$. $p$, Fig. 1, is a retaining-ring screwing onto the exterior of the casing $a$ for maintaining the cutting-plate $g$ in place and securing the adjustment of the same and of the knives $f$ and $h$ in relation to one another.

The meat or other plastic or yielding substance to be cut up is introduced into the machine through the hopper $b$ and carried forward by the rotation of the forcing-screw $d$ to the cutting-plate $g$, receiving during its passage a preliminary cutting between the stationary knife $h$ and the rear edges $i$ of the revolving star-knife $f$. As fast as the meat is forced into the grooves or channels $k$ in the cutting-plate $g$ it is severed by the perfect scissor action which takes place between the edges $k'$ of the grooves $k$ and the edges $f'$ of the knife $f$, the severed portions passing along the grooves $k$ to the outlet-aperture $m$ and being forced therethrough and along the filling-pipe $o$ into skins or other desired receptacles by the continued action of the forcing-screw $d$.

It will be obvious that, if desired, a rotating cutting-plate and stationary knife might be substituted for the stationary cutting-plate and revolving knife described and illustrated.

What I claim, and desire to secure by Letters Patent of the United States, is—

1. In a mincing-machine comprising a casing and a forcing device contained therein, the hereinbefore-described means for cutting up meat and similar plastic or yielding substances, consisting of a plate the face of which is constructed with grooves or channels converging toward or leading to an outlet-aperture, and a knife disposed in cutting contact with the grooved or channeled face of such plate, substantially as described.

2. For the purpose set forth, the combination of a cutting-plate $g$, constructed with grooves or channels $k$ and an aperture $m$, a filling-pipe $o$, secured around the said aperture, and a knife disposed in cutting contact with the grooved or channeled face of the plate, substantially as shown and described.

In witness whereof I have signed my name in the presence of two subscribing witnesses.

THOMAS WILLIAMS, JR.

Witnesses:
A. C. ALEXANDER,
*Patent Agent, 19 Southampton Bldgs., London.*
CHAS. G. REED,
*His clerk.*